(12) United States Patent
Petersen et al.

(10) Patent No.: US 10,528,501 B2
(45) Date of Patent: Jan. 7, 2020

(54) COORDINATED EVENT SEQUENCING

(71) Applicant: Linear Technology Holding LLC, Norwood, MA (US)

(72) Inventors: Michael David Petersen, Elbert, CO (US); Raymond Allen Stevens, Monument, CO (US)

(73) Assignee: Linear Technology Holding LLC, Norwood, MA (US)

( * ) Notice: Subject to any disclaimer, the term of this patent is extended or adjusted under 35 U.S.C. 154(b) by 130 days.

(21) Appl. No.: 15/727,561

(22) Filed: Oct. 6, 2017

(65) Prior Publication Data

US 2018/0336149 A1 Nov. 22, 2018

Related U.S. Application Data

(60) Provisional application No. 62/507,978, filed on May 18, 2017.

(51) Int. Cl.
| | | |
|---|---|---|
| *G06F 13/36* | (2006.01) | |
| *G06F 13/362* | (2006.01) | |
| *G06F 13/42* | (2006.01) | |
| *G06F 1/32* | (2019.01) | |
| *G06F 11/07* | (2006.01) | |

(52) U.S. Cl.
CPC ........... *G06F 13/362* (2013.01); *G06F 1/32* (2013.01); *G06F 11/0745* (2013.01); *G06F 11/0766* (2013.01); *G06F 13/4282* (2013.01)

(58) Field of Classification Search
CPC ........ G06F 13/36; G06F 13/362; G06F 11/07; G06F 11/0706

USPC ........................................................... 714/24
See application file for complete search history.

(56) References Cited

U.S. PATENT DOCUMENTS

| | | | | |
|---|---|---|---|---|
| 3,143,705 A | * | 8/1964 | Currey | H04H 20/103 346/37 |
| 5,317,752 A | * | 5/1994 | Jewett | G06F 1/12 714/14 |
| 5,488,731 A | * | 1/1996 | Mendelsohn | G06F 11/1076 711/114 |
| 6,038,684 A | * | 3/2000 | Liddell | G06F 11/0709 700/3 |
| 7,747,900 B2 | * | 6/2010 | Elliott | G06F 1/305 713/300 |
| 8,627,132 B2 | | 1/2014 | Jurgilewicz | |
| 2008/0046707 A1 | * | 2/2008 | Hirai | G06F 1/26 713/1 |

(Continued)

FOREIGN PATENT DOCUMENTS

| | | |
|---|---|---|
| EP | 3195439 | 11/2018 |
| TW | 201901323 A | 1/2019 |

*Primary Examiner* — Kamini B Patel
(74) *Attorney, Agent, or Firm* — Schwegman Lundberg & Woessner, P.A.

(57) ABSTRACT

Methods and systems of synchronizing events using a plurality of sequencing controllers are provided. For each sequencing controller, a serial communication bus (SCB) is monitored for a first reference level. Upon identifying that the SCB is at the first reference level for a predetermined period, a bit sequence indicative of an event position is broadcast to be arbitrated on the SCB. The SCB is monitored for the arbitrated bit sequence. Upon determining that the arbitrated bit sequence corresponds to the bit sequence of the event position, an event corresponding to the event position is enabled.

32 Claims, 6 Drawing Sheets

(56) References Cited

U.S. PATENT DOCUMENTS

| | | | |
|---|---|---|---|
| 2010/0169695 A1* | 7/2010 | Jurgilewicz | G06F 1/26 713/400 |
| 2015/0021987 A1* | 1/2015 | Stevens | G06F 1/3209 307/18 |
| 2015/0074685 A1* | 3/2015 | Baeuerle | G06F 9/542 719/318 |
| 2018/0307568 A1* | 10/2018 | Braddy | G06F 11/07 |

* cited by examiner

COORDINATED EVENT SEQUENCING

CROSS-REFERENCE TO RELATED APPLICATION

The present application claims the benefit of priority under 35 U.S.C. § 119 from U.S. Provisional Patent Application Ser. No. 62/507,978 entitled "Coordinated Event Sequencing," filed on May 18, 2017, which is hereby incorporated by reference in its entirety for all purposes.

FIELD OF THE DISCLOSURE

This disclosure generally relates to methods and systems for event synchronization. More particularly, the present disclosure relates to methods and systems for event synchronization without a need of synchronized counters.

BACKGROUND

In today's increasingly complex electronic systems, there may be multiple events to be sequenced. By way of non-limiting example, an electronic system may have multiple power supplies to achieve the desired functionality. Frequently, such power supplies are to be turned ON and OFF in a predetermined order with specific time relationships (sequencing) for various reasons, such as preventing damage to the powered devices. Sometimes, the sequencing involves multiple electronic circuits located in physically different locations or sub-assemblies. Accordingly, to perform sequencing amongst multiple devices, there is electrical communication between the electronic circuits, thereby providing a proper sequencing.

Known approaches of coordinating events include time-based sequencing, where each sequencing controller is programmed to enable or disable an event at a specific time relative to a common "start" signal. An example of time-based sequencing is what Power Management Bus (PMBus) defines for sequencing power supplies ON and OFF. While a simple approach, time-based sequencing, does not by itself provide feedback or an ability to wait for an event to happen. Each sequencing controller waits for its prescribed time and then acts in isolation from any other sequencing controller.

A more advanced sequencing method uses a feedback signal to indicate when the next sequencing controller should start. Referring again to the power supplies example, the "power good" output of one power supply can be daisy-chained to a RUN pin of the next. Such a sequencing approach provides a fast sequencing time and the ability to automatically hold off sequencing of downstream events if an upstream event doesn't occur or has a problem. However, this daisy chain approach may not be sufficiently flexible since the sequencing order is typically hard wired.

Another known sequencing method uses a daisy chain approach that includes feedback, but uses a common signal to communicate sequencing order between sequencing controllers. For example, a serial bus signal is arbitrated among all the sequencing controllers. Each sequencing controller also has a counter. When one sequencing controller has completed sequencing, and is ready to allow the next one to go, the serial bus line is released. Upon determining that the serial bus line released, all the sequencing controllers that are coupled to the serial bus then pull down on the serial bus line signal, advancing each counter by 1. When the shared count matches a sequencing controller's preprogrammed position, it enables or disables the event associated therewith. Feedback may be provided in the form of the sequencing controller holding the serial bus line low until the enabled or disabled event has completed. This process repeats itself until all sequencing controllers have finished. This sequencing method provides flexibility to programmatically change the sequencing order, to achieve a fast sequencing time, and the ability to hold off sequencing (which may be indefinite). However, this method relies on all sequencing controllers to have synchronized counters, wherein the synchronization is challenging to verify.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. Some embodiments may be practiced with additional components or steps and/or without all of the components or steps that are described.

The various methods and circuits disclosed herein generally relate to methods and systems of sequencing control for event synchronization among a plurality of devices that are arbitrating for their turn based on their position. Specifically, the present teaching describes a sequencing method and system that uses a serial bus, which may be single wire or a 2-wire differential bus, without a traditional master device. The disclosed methods and systems also provide a sequencing approach that is self-actuating and self-terminating as soon as all turn-ON or turn-OFF events have been achieved, thereby eliminating the need for "start" and/or "stop" signals.

The present disclosure offers a novel sequencing system and protocol. The serial bus, (e.g., single wire or 2-wire differential bus acting as a single signal), referred to herein as the serial communication bus (SCB), is connected to all devices that are configured for event synchronization.

The sequencing operation as described herein provides for self-actuation of sequencing events upon acknowledgment by a corresponding sequencing controller that an arbitrated sequence provided on the SCB matches a sequencing controller's preprogrammed position. It should be noted that a sequencing controller is not limited to using a single preprogrammed position. For example, a first preprogrammed position might be used for the sequence up position, while a second preprogrammed position is used for sequencing down, and a third preprogrammed position might be used for sequencing when a fault is present. Although power may be applied to all devices simultaneously, different devices controlled by their corresponding sequencing controller may have different time periods to configure and stabilize. In one aspect, the present teaching discloses holding the serial communication bus in a fixed state, referred to herein as a second reference level, until an event controlled by a corresponding sequencing controller has completed.

It should be noted that all sequencing controllers that are coupled to the serial communication bus need not be actively participating in the arbitration discussed herein. In one embodiment, participants can join late in the sequence, if their "not-present" vote on the serial communication bus is the recessive value. On the other hand, if their "not present" vote on the serial communication bus is the dominant value, then all sequencing controllers should be present before a sequence can commence. This feature will be further clarified later in the context of the discussion of FIG. 3A.

Accordingly, the sequencing controllers communicate with each other to determine the sequencing position. However, instead of relying on synchronized counters to be included in each device, the sequence position of each sequencing controller is used directly from the serial communication bus. That sequence position number, sometimes referred to herein as the event position, is communicated serially in a dominant/recessive manner, allowing the lowest (or highest) number to win the arbitration and determine the current sequence position. Sequencing controllers that have finished do not participate in the arbitration, allowing the active sequencing position to advance as events are completed.

Additionally, since a counter is not used, stepping through all unused sequence positions is obviated, thereby providing a faster sequencing time. These unused sequence positions can then be utilized by future sequencing controllers that may be introduced into the unused portions (e.g., middle) of the sequence without requiring all other sequencing controllers to be reprogrammed. Also, since the full sequence position is broadcast to all sequencing controllers, it is now possible to skip forward or backwards in the sequence to, for example, handle fault scenarios where some controllers are triggered to turn OFF immediately while others continue to sequence down (or vice versa).

In various embodiments, different approaches in broadcasting the sequence position are also possible, such as broadcasting the bit-wise inverse of the sequence position, allowing the highest value to win arbitration. Also, variations on when to vote are possible, such as broadcasting when a fault is present, if your channel will turn OFF in response. By virtue of the architecture discussed herein, a rich set of complex behaviors can be realized.

In addition to the present sequence position, extra information, such as (but not limited to) sequencing direction (up vs. down), fault information, sequencing group (for multiple, simultaneous but independent sequences), jump commands, ready status, etc., can also be communicated between devices. Accordingly, a richer and advanced sequencing scheme can be implemented.

By using a serial bus solution without a master and slave configuration, no additional circuits are required to fulfill master/slave functionalities, which reduces the complexity and physical area to implement event synchronization, while maintaining the quality of reliable operation. By virtue of the concepts discussed herein a control of enable/disable event signals in an arbitrary number of sequence positions is provided. In contrast to some prior art systems, counting through intermediate sequence positions, whether used or not, is not required. In some embodiments, there is an ability to turn OFF a group of sequencing controllers upon identifying a fault condition. These and other features may be better understood in view of the figures, which are discussed in detail below.

Example Architecture

Figure 1:
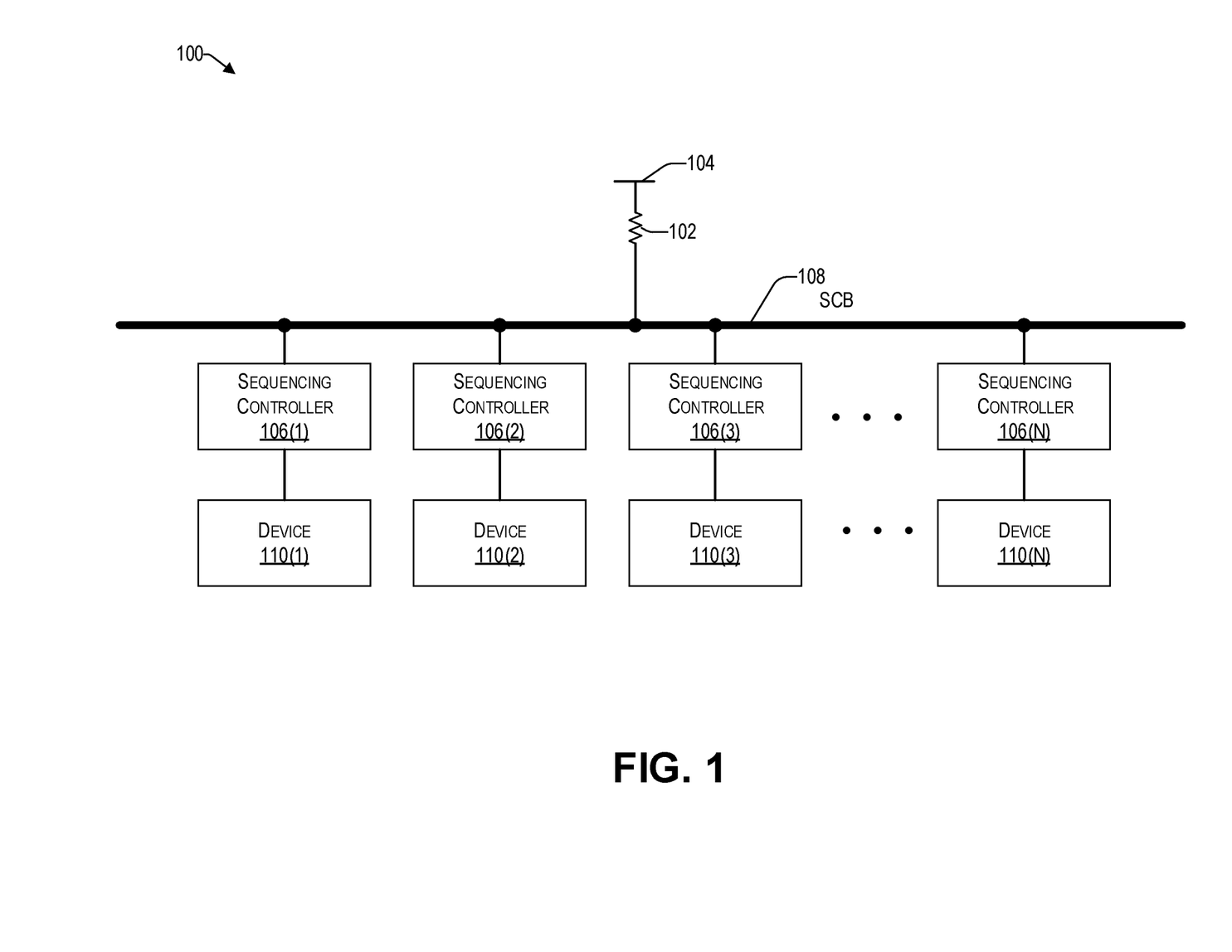
FIG. 1 is an example high level diagram of an event synchronization system, consistent with an illustrative embodiment.

FIG. 1 is an example high level diagram of an event synchronization system 100, consistent with an illustrative embodiment. The system includes a plurality of sequencing controllers 106(1) to 106(N) coupled to a serial communication bus (SCB) 108, which may be single ended or differential. In various embodiments, the serial communication bus 108 is pulled to a first reference level 104 (which may be $V_{DD}$) via a current source, resistor, transistor, or any other appropriate device, represented by way of example as a resistor 102. Thus, the SCB 108 defaults to the first reference level 104. This level can be considered the recessive level. Each sequencing controller 106(1) to 106(N) can pull the serial communication bus 108 to a second reference level (e.g., ground, which may be considered the dominant level), as will be discussed in more detail in FIG. 2.

Each sequencing controller 106(1) to 106(N) is coupled to one or more devices 110(1) to 110(N), respectively, that are controlled by their corresponding sequencing controller 106(1) to 106(N), respectively, for scheduling events. Example scheduled events may include, without limitation, power supply turn-ON and/or turn-OFF. In this regard, the sequencing control from the sequencing controllers pertains to the orderly turn-ON and/or turn-OFF of the power supplies.

In one embodiment, the system is modular in that additional sequencing controllers can be added as desired, to the extent allowed by the number of position bits. For example, for a 3-bit position, 8 independent sequencing controllers can be accommodated. In some embodiments, the position is shared by two or more sequencing controllers, which enables the activation of several devices simultaneously. Alternatively, or in addition, several devices may be coupled to a single sequencing controller to provide parallel activation.

While power supplies are used in describing the present teachings, it will be understood that other devices that would benefit from orderly sequencing are within the scope and spirit of the present disclosure.

Example Sequencing Controller

Figure 2:
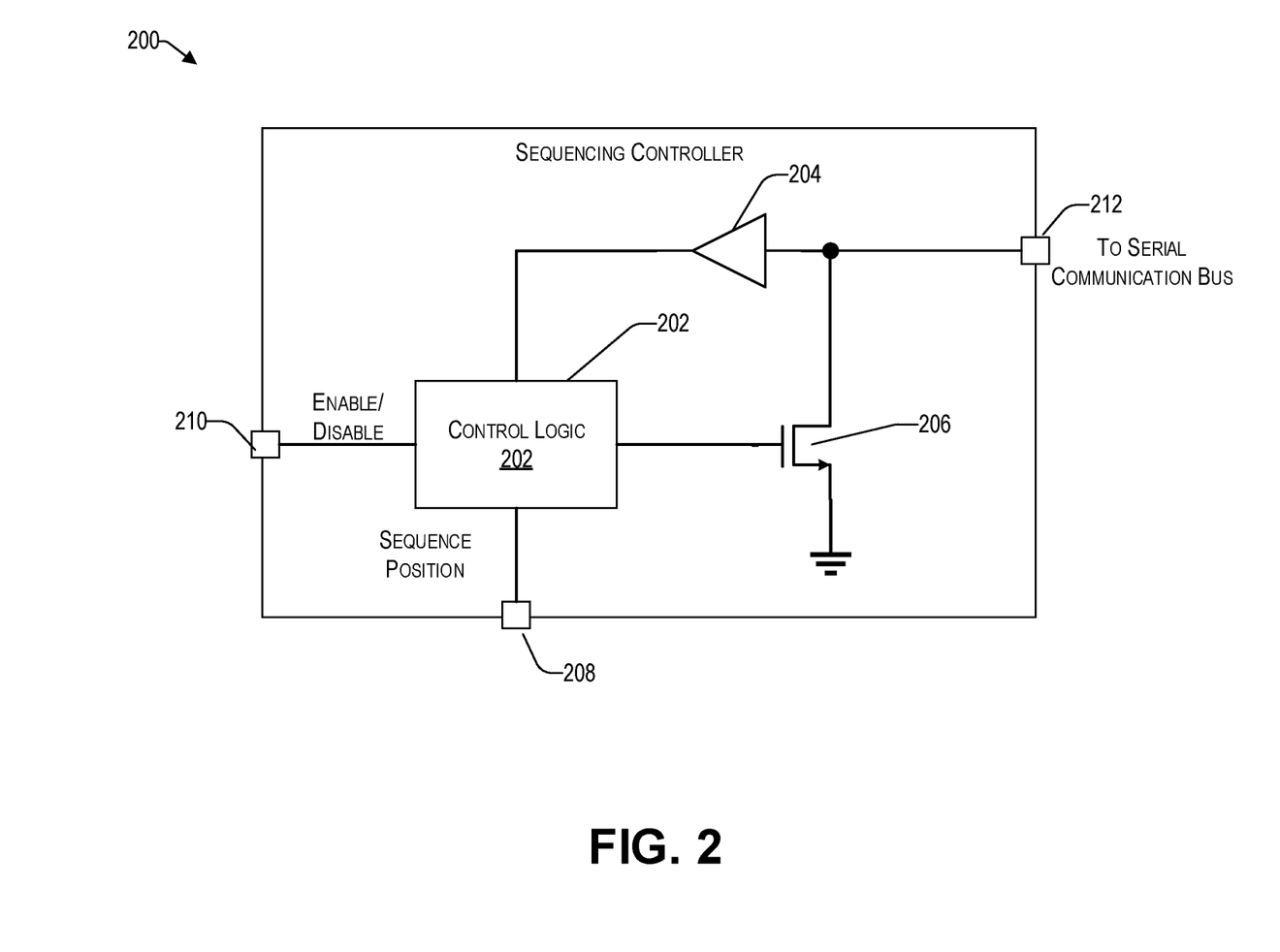
FIG. 2 illustrates an example sequencing controller, consistent with an illustrative embodiment.

FIG. 2 illustrates an example architecture of a sequencing controller 200 that may be used to implement a sequencing controller of FIG. 1. The sequencing controller 200 includes a bidirectional terminal 212 that leads to the serial communication bus. The sequencing controller 200 also includes a buffer 204, a control logic unit 202, and a switch 206. The buffer 204 has an input coupled to the serial communication bus via the terminal 212. The control logic unit 202 is coupled to an output of the buffer 204. The control logic unit 202 includes an enable/disable pin 210 that is operative to turn-ON and/or turn-OFF a device coupled thereto, such as a power supply or any other device that is subject to event synchronization. The control logic unit 202 includes an input to receive a sequence position 208 during an initialization phase (e.g., when the control logic is programmed with a possibly unique number that is used as an event position).

There is a switch 206, represented by way of example only, and not by way of limitation, as a N-channel Metal Oxide Semiconductor (NMOS), having a first node (e.g., drain) coupled to the serial communication bus 212, a second node (e.g., source) coupled to a reference voltage (e.g., ground), and a control node (e.g., gate) coupled to an output of the control logic unit 202.

The bidirectional terminal 212 enables the sequencing controller 200 to receive information from and broadcast information over the serial communication bus, which may be shared by other similar sequencing controllers for event synchronization. The buffer 204 acts as a receiver of the information provided on the serial communication bus via the terminal 212.

The control logic unit 202 is configured to receive a sequence position representing its event position in an event synchronization system of several sequencing controllers that share the serial communication bus. For example, the control logic 202 may be programmed with the sequence position during an initial setup phase (where the control logic unit and its corresponding device (e.g., power supply) coupled to the output of the enable/disable pin 210 are introduced to the event synchronization system discussed herein).

Accordingly, the sequencing controllers are joined to the serial communication bus, which is pulled to a first reference level, such as $V_{DD}$, via a current source or resistance element, as discussed previously in the context of FIG. 1. The serial communication bus can be actively pulled to a second reference level (e.g., such as GND) inside each sequencing controller 200 via the control logic unit 202, by turning ON switch 206. Thus, if any sequencing controller that is coupled to the serial communication bus pulls the signal on the serial communication bus to the second reference level, the resulting signal level (low in this example) is dominant over the high signal level from the pull up resistor 102 of FIG. 1.

Accordingly, by turning ON and OFF transistor 206, the control logic 202 can broadcast its stored bit sequence (representing its event position) via terminal 212 to the serial communication bus. Any sequencing controller 200 may also hold the signal level of the serial communication bus to the second reference level (e.g., GND) for an extended period, thereby not relinquishing control of the serial communication bus. For example, holding the bus to the second reference level for a predetermined period may indicate that the device coupled to its pin 210 has not completed its event (e.g., the power supply coupled to node 210 has not completely ramped to a predetermined level). In one embodiment, such failure to meet one or more criteria of an event is identified as a failure, discussed in more detail later.

In one embodiment, the control logic unit 202 has an additional pin (not shown) to receive the status information of the device coupled to the pin 210 (e.g., to indicate whether the event initiated by the sequencing controller has completed).

Upon the initiation and/or completion of the relevant event (controlled via the enable/disable pin 210) the sequencing controller 200 releases its pull-down device (i.e., switch 206), allowing the serial communication bus signal to rise to the first reference level (e.g., via the resistance element 102 of FIG. 1). Upon identifying a first reference level for a predetermined period, each sequencing controller coupled to the serial communication bus understands that the bus has been released, thereby triggering another cycle. In one embodiment, the duration of the predetermined period at the first reference level, which indicates the bus has been released, is provided by equation 1 below:

$$\text{Period} \geq P(N+1) \quad \text{(Eq. 1)}$$

Where:
P=Time each bit of the position is broadcasted on the SCB; and
N=number of bits in the position.

The period defined by equation 1 is sufficiently long such that any participating sequencing controller, including one that wakes up in the middle of a message, can determine that the bus has been released. Other embodiments support a shorter release period by inserting extra bits into the message at repeated intervals. These extra bits can be broadcast at the second level. For such alternative embodiments, the release period need only be slightly longer than the interval between the extra second level bits.

A first reference level for the predetermined period of equation 1 above initiates each participating sequencing controller to engage in a digital communication on the serial communication bus by serially broadcasting its sequence position, sometimes referred to herein as its event position. In one embodiment, the bit sequence is broadcast starting with the most significant bit (MSB), while other orders are contemplated as well.

When the sequencing controller 200 has completed the enabling of its corresponding event after winning the arbitration on the serial communication bus, in various embodiments, the sequencing controller 200 broadcasts, before the next cycle, (i) a sequence position of all recessive states (high in this example), (ii) a sequence position that is known to be higher than any other sequence state, or (iii) a predetermined bit pattern that is indicative that it has completed its enablement (and/or completion) of its corresponding event. In one embodiment, a bit pattern is provided that indicates the status of the event, (e.g., timed-out vs. power-good, or in continuous mode vs. discontinuous mode, etc.) All sequencing controllers may perform the same function upon completion of their corresponding event.

The sequencing controller 200 not only broadcasts its event position as a bit sequence, but can also monitor the arbitration result on the serial communication bus. For example, each sequencing controller 200 may broadcast a bit on the serial communication bus and then read what signal level the serial communication bus is at. Each received bit may be stored in the control logic 202. Upon identifying that the arbitrated bit sequence on the serial communication bus corresponds to the bit sequence of the event position of the sequencing controller 200 (i.e., identified as an arbitration "win" for the sequencing controller 200), then the control logic unit 202 changes the state (e.g., enables or disables) the corresponding event via pin 210. In one embodiment, the control logic unit 202 maintains the serial communication bus at the second reference level until the enablement or disablement of the device coupled to the control logic unit 202 (i.e., via pin 210) is complete.

In contrast, if the sequencing controller 200 identifies an arbitrated bit sequence on the serial communication bus to not correspond to its bit sequence of the event position, then the control logic 202 enters a hold pattern, referred to herein as a standby mode, where the sequencing controller 200 does not enable or disable its corresponding device (e.g., power supply) via the pin 210 and does not broadcast on the serial communication bus until the next cycle. Accordingly, each sequencing controller is also listening during the arbitration process.

Figure 3A:
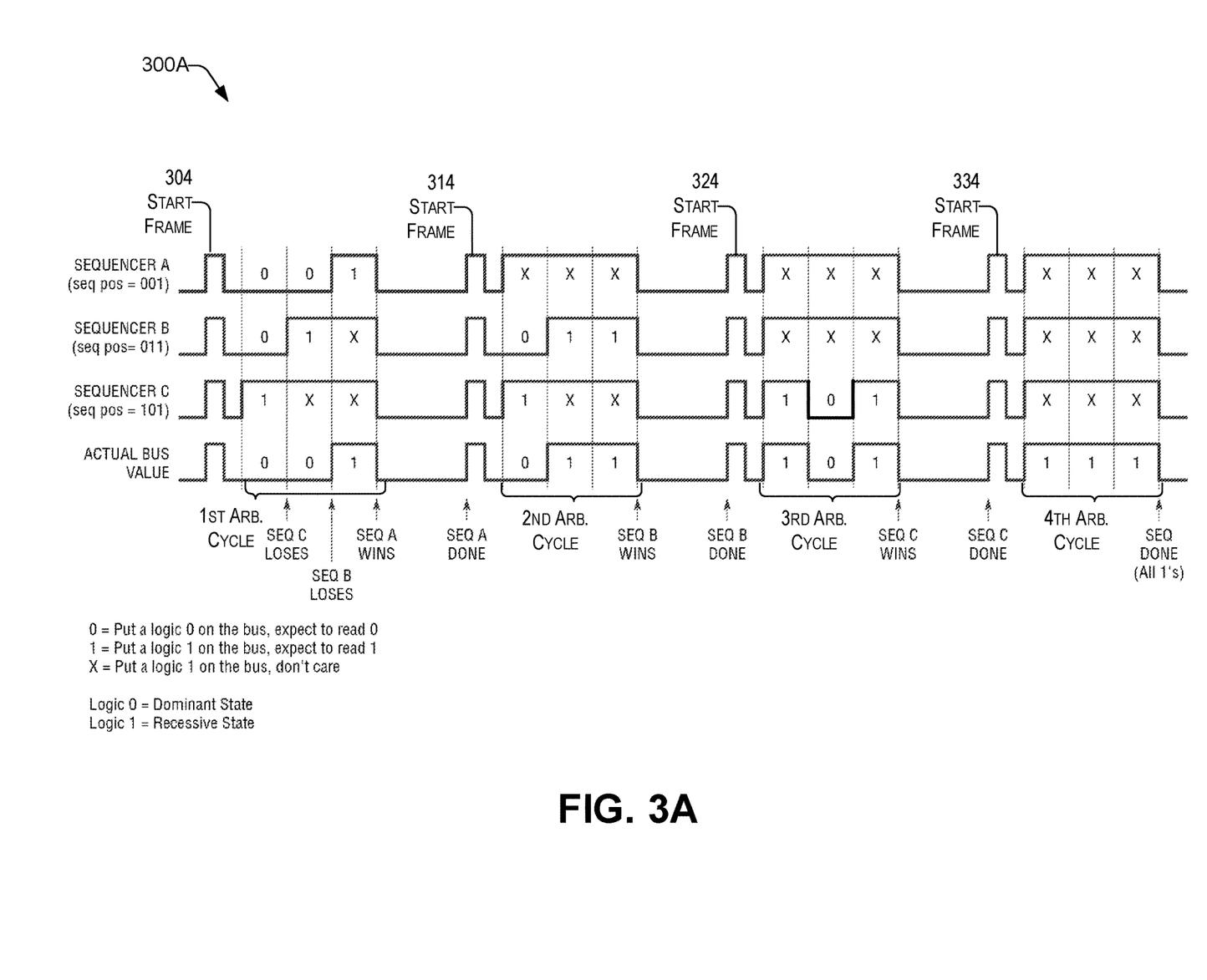
FIG. 3A is a timing diagram that illustrates an example arbitration of a sequence of signals on the serial communication bus in a first direction, consistent with an illustrative embodiment.

FIG. 3A is a timing diagram that illustrates an example arbitration of an up sequence of signals on the serial communication bus, consistent with an illustrative embodiment. Each arbitration cycle is initiated with a start frame 304, 314, 324, and 334, respectively. In one embodiment, in each start frame, the serial communication bus is kept at a first reference level for the predetermined period as discussed in the context of equation 1 above. To avoid clutter, the duration of the predetermined period of the start frame is not drawn to scale in FIG. 3A (which should be longer than the time it takes to broadcast the number of bits of the event position).

During the first arbitration cycle, sequencers A, B, and C broadcast their event position, one bit at a time, on the serial communication bus. After each broadcasting of a bit of their event position, each sequencer reads the arbitrated information on the serial communication bus. In the present example, the second reference level (i.e., ground) is dominant over the first reference level (i.e., $V_{DD}$). Since sequencer A has the smallest event position (i.e., 001) the actual bus value of 001 is identical thereto. Accordingly, sequencer A wins the first arbitration cycle. Since sequencer A wins the arbitration, it refrains from subsequent cycles and enters a standby mode to allow the remaining sequencers to have their turn.

During the second arbitration cycle, remaining sequencers B and C broadcast their event position one bit at a time, on the serial communication bus, while sequencer A is in standby mode. Since the event position of sequencer B has a smaller value than that of sequencer C, sequencer B wins the arbitration and therefore refrains from participating in subsequent arbitration cycles.

During the third arbitration cycle, the remaining sequencer C broadcasts its event position and wins by default. Since all sequencers, A to C, refrain from the next cycle (fourth arbitration cycle), the actual bus value indicates a start frame followed by the serial communication bus being kept at a first level for a predetermined period, thereby indicating that all sequencers have had their turn and that all sequencers can participate in the following cycle.

Thus, when all events in a single sequence position are complete, the serial communication bus signal is released (e.g., allowed to rise again to the first reference level), causing the process to repeat until all assigned sequence positions are finished. When a sequence position of all recessive states (high in this example) is seen on the serial communication bus, all sequencing controllers sharing the same serial communication bus can then identify that the entire sequence is complete.

In some scenarios, it may be appropriate to sequence down as well. In various embodiments, the order of the down sequence may be the same or different from sequencing up. For example, a power supply system may want to prevent damage by turning OFF all power supplies simultaneously or by turning OFF devices in the same order as they were turned ON. Put differently, the same event position may be used both when sequencing up or down.

In other embodiments, the sequence down position may be different from that of sequence up. To that end, each sequencing controller may have a separate sequence position that is activated upon learning that a second (e.g., down) sequencing is presently being executed. To that end, a separate location in a memory of the sequencing controller may be used to store the second sequence position. Thus, separate memory bits may be used to store different event positions.

In one embodiment, a separate memory location is not used. Rather, the same position is used but simply inverted via an inverter to implement a reverse order. For example, if the original position is 110, then the reverse position is 001. Such inversion is made possible if the reverse sequencing order is opposite to that of the forward sequencing order. In this way, a separate event position need not be stored in the sequencing controller, thereby saving valuable memory resources.

Figure 3B:
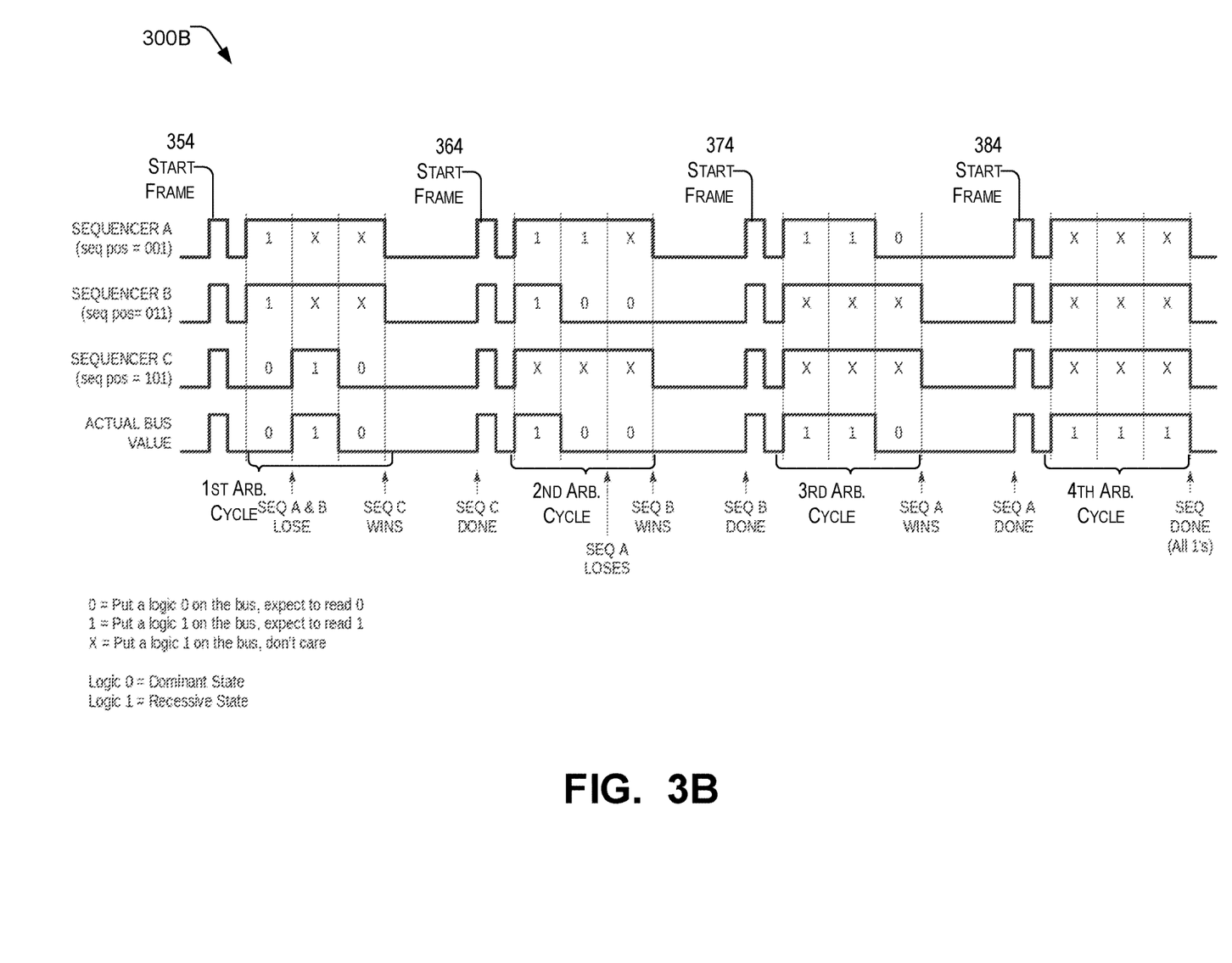
FIG. 3B is a timing diagram that illustrates an example arbitration of a sequence of signals on the serial communication bus in a second direction, consistent with an illustrative embodiment.

FIG. 3B is a timing diagram that illustrates an example arbitration of a sequence of signals on the serial communication bus in a second direction, consistent with an illustrative embodiment. The arbitration 300B is a reverse order power supply OFF sequence, using inverted positions. Each arbitration cycle is initiated with a start frame 354, 364, 374, and 384, respectively.

During the first arbitration cycle, sequencers A, B, and C broadcast their inverted event position, one bit at a time, on the serial communication bus. After each broadcasting of a bit of their event position, each sequencer reads the arbitrated information on the serial communication bus. In the present example, the second reference level (i.e., ground) is dominant over the first reference level (i.e., $V_{DD}$). Since sequencer C has the smallest inverted event position (i.e., 010) the actual bus value of 010 is identical thereto. Accordingly, sequencer C wins the first arbitration cycle. Since sequencer C wins the arbitration, it refrains from subsequent cycles and enters a standby mode to allow the remaining sequencers to have their turn.

During the second arbitration cycle, remaining sequencers A and B broadcast their inverted event positions one bit at a time, on the serial communication bus, while sequencer C is in standby mode. Since the inverted event position of sequencer B (100) has a smaller value than that of sequencer A (110), sequencer B wins the arbitration and therefore refrains from participating in subsequent arbitration cycles.

During the third arbitration cycle, the remaining sequencer A broadcasts its inverted event position and wins by default. Since all sequencers, A to C, refrain from the next cycle (fourth arbitration cycle), the actual bus value indicates a start frame followed by the serial communication bus being kept at a first level for a predetermined period, thereby indicating that all sequencers have had their turn and that all sequencers can participate in the following cycle.

Thus, when all events in a single sequence position are complete, the serial communication bus signal is released (e.g., allowed to rise again to the first reference level), causing the process to repeat until all assigned sequence positions are finished. When a sequence position of all recessive states (high in this example) is seen on the serial communication bus, all sequencing controllers sharing the same serial communication bus can then identify that the entire sequence is complete.

Example Fault Control

In one embodiment, a sequencing controller (e.g., 106(1) in FIG. 1) can provide fault information about its corresponding device 110(1) via the serial communication bus 108.

For example, it may take a device that is controlled by a sequencing controller, such as a power supply, some time to complete an event. To that end, in one embodiment, the sequencing controller may interact with the device (e.g., power supply) to receive a confirmation or measure a voltage level therefrom, to confirm that the event has successfully completed. If a confirmation is not provided within a predetermined threshold time or the desired effect is not achieved (e.g., a desired voltage is not within tolerances), then a fault condition may exist, which is communicated to other sequencing controllers (e.g., 110(2) to 110(N)) that are coupled to the serial communication bus 108.

In various scenarios, it may be appropriate to turn OFF (and/or prevent the turn ON) of other devices that rely on this device 110(1) (e.g., power supply). For example, some devices (e.g., 110(2)) may be not operate reliably or even be damaged without the proper activation of the prior event (e.g., 110(1)). In one embodiment, instead of releasing the bus by broadcasting a start frame, as discussed in the context of FIG. 3A, the fault condition is broadcast via a predetermined bit sequence (e.g., 101010) immediately after the sequencing controller 106(1) releases the serial communication bus 108. In various embodiments, a generic fault code or a specific fault code that describes the exact fault may be broadcast on the serial communication bus. In this way, other sequencing controllers that are coupled to the serial communication bus can be triggered to be turned OFF or ushered into an alternate state, as appropriate.

In some scenarios, a fault condition is determined by a sequencing controller after releasing the serial communication bus. For example, a fault condition may be identified after other devices (e.g., power supplies) have been enabled, which may adversely affect a previously enabled device (e.g., power supply having an earlier event position). In such a scenario, the sequencing controller that has identified the fault can exit the standby mode, to broadcast the fault condition on the serial communication bus. To that end, the subject serial controller waits for the next arbitration cycle to arbitrate its event position, one bit at a time, on the serial communication bus. In addition, the event position arbitration is preceded by state arbitration, enabling faulted controllers to win over non-faulted controllers. The subject sequencing controller will win the arbitration unless there is another sequencing controller that has identified a fault condition between the same cycles having a lower (i.e., more preferential) event position. Upon winning the arbitration, the subject sequencing controller can then broadcast the fault condition on the serial communication bus for other sequencing controllers to read.

In one embodiment, a single arbitrated state bit precedes the event position bits at the start of each cycle. During this state bit, the dominant level is broadcast by all sequencing controllers that have detected a fault in their device (110), and the recessive level is broadcast by all controllers that have not detected a fault in their device. This specific bit is referred to as the fault state bit. If no controllers are faulted, arbitration continues as described for FIG. 3A, and the lowest sequence position wins. If any controllers are faulted, then all non-faulted controllers lose arbitration after this fault state bit, and stop broadcasting for the rest of the current cycle, allowing the faulted controllers to arbitrate amongst themselves. The lowest position faulted controller wins, thus broadcasting the position of the lowest fault to the entire system. Individual controllers can then take action based on their position relative to the fault position just received. For example, if their sequence-OFF position is earlier than the fault position, they may turn OFF their device immediately. if their sequence-OFF position is later than the fault position, they may wait to be sequenced OFF.

In some systems, it is desirable to broadcast fault related information as fast as possible. For these systems, it is advantageous to avoid holding the bus in the dominant state for long periods of time while a specific controlling sequencer is waiting for its event to complete. Instead, after the fault state bit and position arbitration is complete, the SCB is released, allowing a new cycle to begin immediately. This enables a sequencing controller that has detected a new fault to broadcast this information without waiting for a non-faulted sequencing controller to finish its event. When no fault is present in the system, a sequencing controller repeatedly broadcasts its position until its event has completed, thereby holding off additional event sequencing in a manner similar to that achieved by holding the SCB in the dominant state until its event is complete.

Additional embodiments are contemplated that increase the number of state bits that are broadcast preceding the position bits, such as sequence direction (up verses down), sequence group identification bits (to enable multiple interleaved sequences), and fault priority bits.

Example Process

Figure 4:
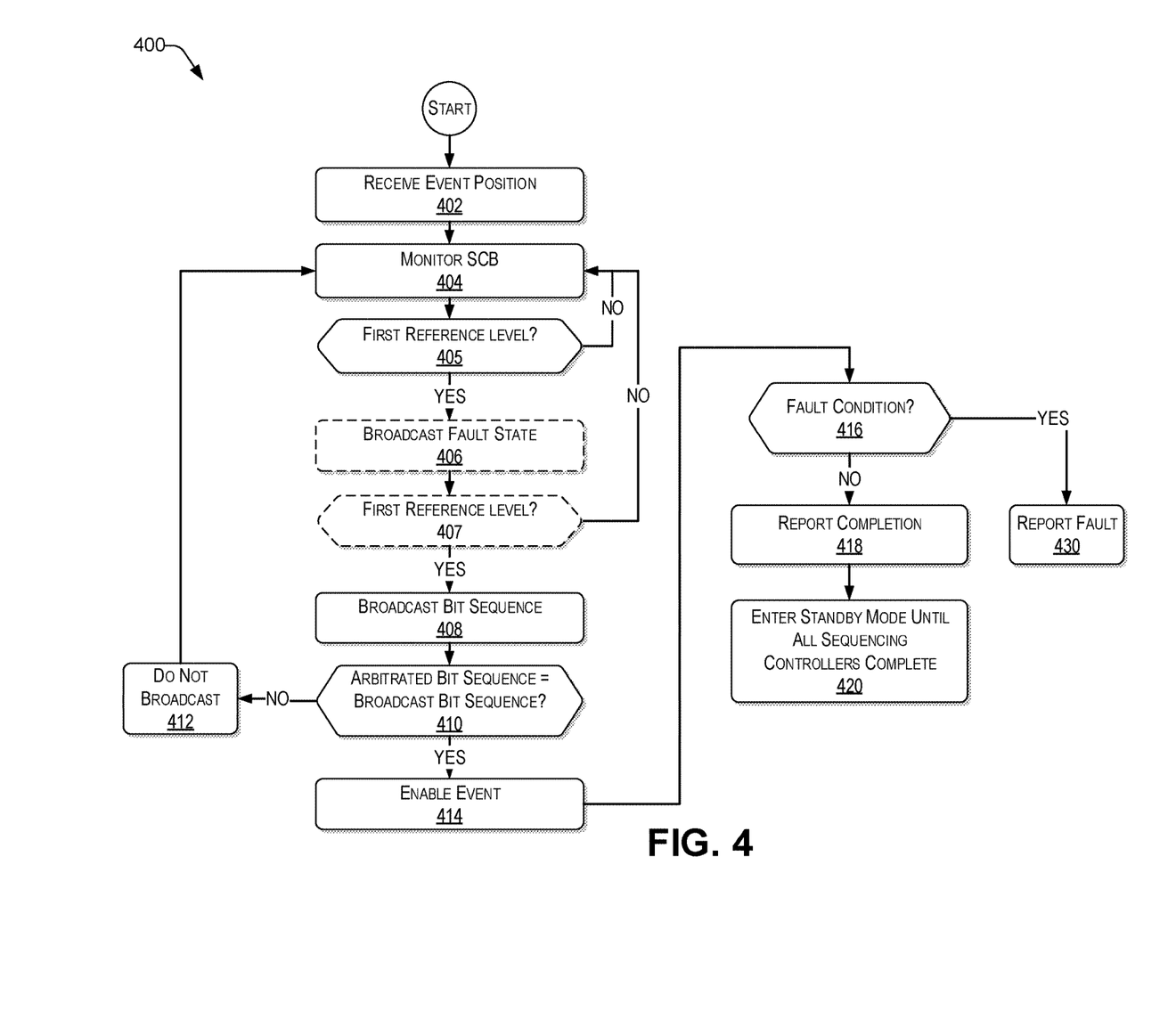
FIG. 4 presents an illustrative process for synchronizing events using a plurality of sequencing controllers.
Figure 5:
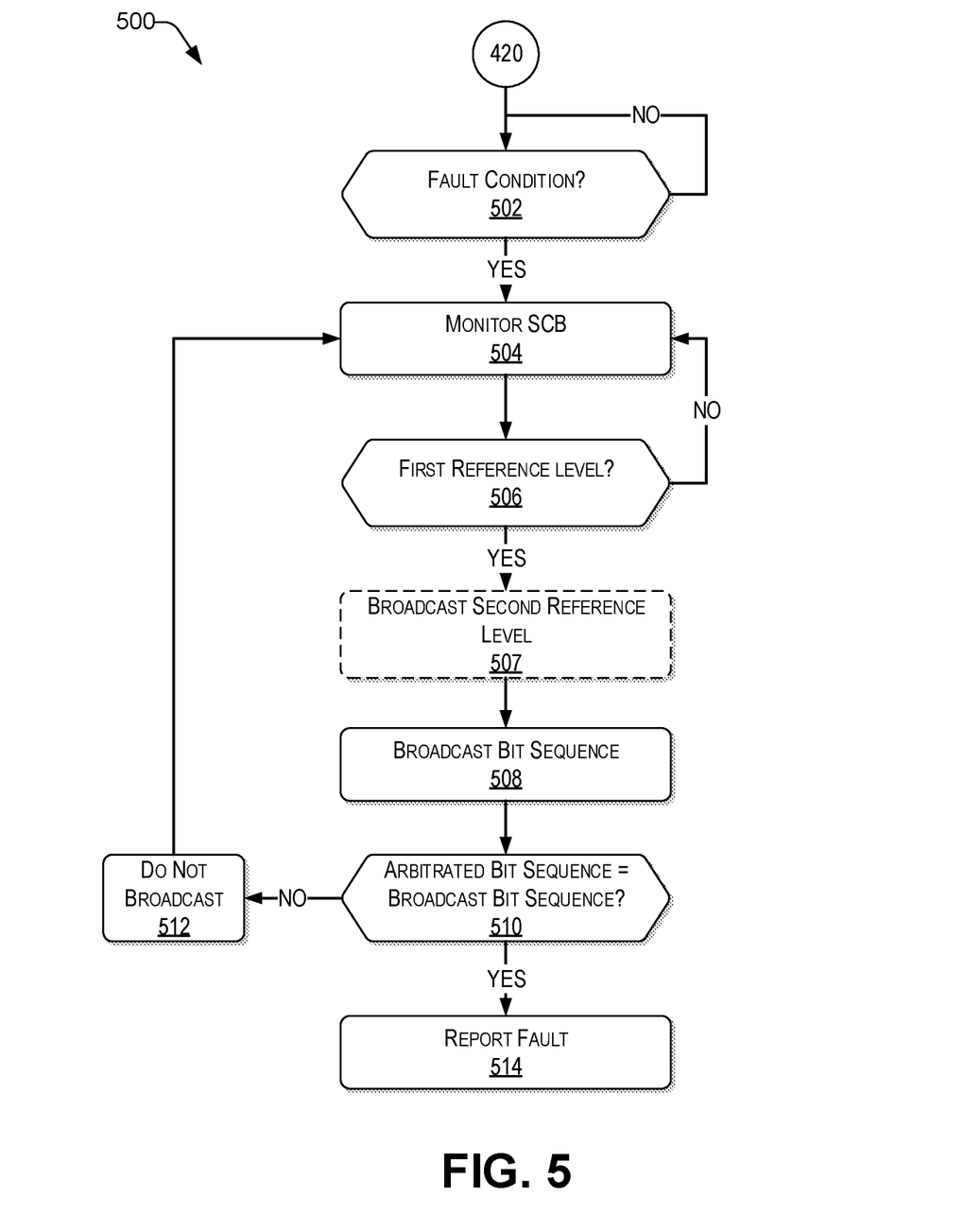
FIG. 5 presents an illustrative process for reporting a fault after the serial communication bus has been released.

With the foregoing overview of the architecture 100 and example sequencing controller 200, it may be helpful now to consider a high-level discussion of an example process. To that end, FIG. 4 presents an illustrative process 400 for synchronizing events using a plurality of sequencing controllers. FIG. 5 presents an illustrative process 500 for reporting a fault after the serial communication bus has been released. Processes 400 and 500 are illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the processes 400 and 500 are described with reference to the architecture 100 of FIG. 1 and the sequencing controller 200 of FIG. 2.

At block 402, the event position information is received by one or more sequencing controllers, each as a unique series of bits. The event position information may be received during a setup phase of the system 100 and/or when a new sequencing controller is added.

At block 404, each sequencing controller (e.g., 106(1) to 106(N)) monitors the serial communication bus for a first reference level, which may be $V_{DD}$.

Upon determining that the serial communication bus is not at the first reference level for a predetermined period (i.e., "NO" at decision block 405), the process continues with block 404. However, upon determining that the first reference level is at the serial communication bus for a predetermined period (i.e., "YES" at decision block 405), the process continues with block 406, where each sequencing controller coupled to the serial communication bus broadcasts its fault state bit in cohort, if available.

At block 407, each sequencing controller determines whether the SCB is at the dominant or recessive level. If the SCB is at the dominant level (i.e., "NO" at decision block 407), indicating that at least one sequencing controller has detected a fault, the process continues with block 404. However, if the SCB is at the recessive level (i.e., "YES" at the decision block 407), indicating that no faults have been detected, then, the process continues with block 408, where each sequencing controller coupled to the serial communication bus broadcasts its unique event position in cohort, one bit at a time.

At block 410, each sequencing controller determines whether the arbitrated event position that it has monitored on the serial communication bus is identical to the one it broadcast. In one embodiment, this determination is performed on a bit-by-bit comparison basis. Since in our example each sequencing controller 106(1) to 106(N) has a unique event position, only one sequencing controller can win this arbitration in each iteration (i.e., arbitration cycle). Upon determining that the arbitrated event position is not identical to the broadcast event position (i.e., "NO" at decision block 410), the process continues with block 412, where the sequencing controller that did not win the arbitration does not broadcast its event position information on the serial communication bus 108. Instead, at block 402 it continues to monitor the serial communication bus for the next iteration (i.e., block 404).

Returning to block 410, upon determining that the arbitrated event position is identical to the broadcast bit sequence (i.e., "YES" at decision block 410), the process continues with block 414, where the event corresponding to the sequencing controller that has won the arbitration is enabled. For example, a power supply may be turned ON or OFF.

At block 416 the sequencing controller that has won the arbitration determines whether there is a fault condition. For example, a fault condition may be triggered when the event does not meet threshold criteria, such as completing within a threshold time or generating a desired voltage. If so (i.e., "NO" at determination block 416), at block 418 the completion of the event is reported on the serial communication bus 108. For example, a predetermined bit or bit stream is broadcast on the serial communication bus 108 to indicate to the other coupled sequencing controllers that the event has completed without fault. In some embodiments, it is not determined whether the event has completed. Rather, the initiation of the event is reported in block 418.

At block 420, the sequencing controller that has won the arbitration disengages from subsequent iterations and enters a standby mode until all other sequencing controllers have had their turn (i.e., have won the arbitration and initiated their events) and the cycle repeats. Put differently, the arbitration process repeats iteratively until all sequencing controllers have had their turn.

In various embodiments, when a sequencing controller is in standby mode, the disengaged sequencing controller may (i) not broadcast; (ii) broadcast a maximum event position (e.g., 1111 . . . 1); or (iii) any event position that is higher than that of any other sequencing controller coupled to the serial communication bus 108, for any subsequent iteration.

In one embodiment, the system 100 also provides fault information. For example, at block 416, upon determining a fault condition (e.g., that the event did not complete within a threshold time (i.e., "NO" at decision block 416)), the process continues with block 430, where the serial communication bus is not released. Rather, the fault condition is reported on the serial communication bus 108 such that other sequencing controllers can be triggered to be turned ON, OFF, or any other state, accordingly.

In one embodiment, fault conditions can be reported after a subject sequencing controller has won and then released the serial communication bus. To that end, FIG. 5 presents an illustrative process 500 for reporting a fault after the serial communication bus has been released. In various embodiments, process 500 can run independently or after block 420 of process 400.

At block 502, each sequencing controller that already has had their turn, determines whether there is a fault condition. If there is no fault condition (i.e., "NO" at decision block 502), the corresponding sequencing controller stays in standby mode. However, upon identifying a fault condition (i.e., "YES" at decision block 502), the process continues with block 504, where the subject sequencing controller (that has identified the fault) monitors the serial communication bus for the serial communication bus to be at the first reference level for a predetermined period.

Upon determining that the first reference level is not present on the serial communication bus (i.e., "NO" at decision block 506), the process continues to monitor the serial communication bus. However, upon determining that the serial communication bus is at the first reference level a predetermined period (i.e., "YES" at decision block 506), the process continues with block 507, where each sequencing controller coupled to the serial communication bus broadcasts its fault state bit in cohort.

At block 507, in one embodiment, the sequencing controller that has detected a fault in its device broadcasts the second reference level (the dominant value), then the process continues with block 508, where each sequencing controller coupled to the serial communication bus broadcasts its unique event position in cohort, one bit at a time, if said sequencing controllers also detected faults in their devices.

At block 510, each sequencing controller determines whether the arbitrated event position that it has monitored on the serial communication bus is identical to the one it broadcast. In one embodiment, this determination is performed on a bit-by-bit comparison basis. Since in our example the subject sequencing controller already had its turn, the subject sequencing controller is expected to win the arbitration (unless another sequencing controller having a lower event position also identifies a fault condition).

However, upon determining that the arbitrated event position is not identical to the broadcast event position (i.e., "NO" at decision block 510), the process continues with block 512, where the subject sequencing controller waits for the next cycle by continuing to monitor the serial communication bus for the next iteration (i.e., block 504). Such situation may arise when more than one sequencing controller identifies a fault condition during a same period, wherein the other sequencing controller has an event position that is lower in number than the subject sequencing controller.

Returning to block 510, upon determining that the arbitrated event position is identical to the broadcast bit sequence (i.e., "YES" at decision block 510), the process continues with block 514, where the fault is broadcast on the serial communication bus. In this way, a sequencing controller can regain priority of the serial communication bus.

CONCLUSION

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/ or advantages. These also include embodiments in which the components and/or steps are arranged and/or ordered differently.

For example, any signal discussed herein may be scaled, buffered, scaled and buffered, converted to another mode (e.g., voltage, current, charge, time, etc.,), or converted to another state (e.g., from HIGH to LOW and LOW to HIGH) without materially changing the underlying control method. Further, while a serial communication bus is discussed herein by way of example, differential wiring is within the scope of the present disclosure.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently. For example, bipolar transistors (e.g., PNP or NPN) or junction gate field-effect transistors (JFET) can be used instead of MOS transistors. A PNP may be used instead of NPN, and a PMOS may be used instead of NMOS.

Unless otherwise stated, all measurements, values, ratings, positions, magnitudes, sizes, and other specifications that are set forth in this specification, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

All articles, patents, patent applications, and other publications that have been cited in this disclosure are incorporated herein by reference.

It will be understood that the terms and expressions used herein have the ordinary meaning as is accorded to such terms and expressions with respect to their corresponding respective areas of inquiry and study except where specific meanings have otherwise been set forth herein. Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

What is claimed is:

1. A method of synchronizing events using a plurality of sequencing controllers, the method comprising:
    monitoring, by one or more of the plurality of sequencing controllers, a serial communication bus (SCB) for a first reference level;
    upon identifying that the SCB is at the first reference level for a predetermined period, broadcasting a bit sequence indicative of an event position to be arbitrated on the SCB;
    monitoring the SCB for the bit sequence;
    upon a given sequencing controller of the plurality of sequencing controllers determining that the monitored bit sequence corresponds to the bit sequence of the event position of the given sequencing controller, determining that the given sequencing controller wins a state arbitration and enabling an event corresponding to the event position, and
    causing the given sequencing controller that wins the state arbitration to not participate in a subsequent event position arbitration.

2. The method of claim 1, further comprising, upon determining that the enabled event has completed within a threshold time:
    reporting the completion on the SCB; and
    entering a standby mode until at least one of: (i) each of the plurality of sequencing controllers have had a turn to win an arbitration on the SCB, (ii) a sequencing direction change is detected, or (iii) a fault condition is identified.

3. The method of claim 2, wherein the standby mode comprises at least one of:
    (i) not broadcasting the bit sequence in subsequent arbitration cycles; or
    (ii) broadcasting an event position higher than that of any other sequencing controller of the plurality of sequencing controllers.

4. The method of claim 1, further comprising, upon enabling the event:
    reporting the enablement on the SCB; and
    staying in a standby mode for subsequent arbitration cycles until at least one of: (i) each of the plurality of sequencing controllers have had a turn to win an arbitration on the SCB, (ii) a sequencing direction change is detected, or (iii) a fault condition is identified.

5. The method of claim 1, further comprising, upon determining a fault condition:
    preventing a release of the SCB for subsequent arbitration cycles; and
    reporting the fault condition on the SCB.

6. The method of claim 1, further comprising, maintaining the SCB at a second reference level during the enabling of the event.

7. The method of claim 1, wherein monitoring the SCB for the arbitrated bit sequence comprises:
    reading a level of the SCB, for every broadcast bit of the event position;
    storing the level of the SCB, for every broadcast bit of the event position, in a memory of the given sequencing controller, to create a present bus position; and
    comparing the event position to the present bus position.

8. The method of claim 1, wherein, during an arbitration, the second reference level is dominant over the first reference level on the SCB.

9. The method of claim 1, wherein an event position of a down sequence of event synchronization is a bit-wise inverse of the event position of an up sequence.

10. The method of claim 1, further comprising arbitrating a state bit prior to performing event position arbitration, wherein a loss of the state arbitration causes a sequencing controller that wins the state arbitration to not participate in the event position arbitration.

11. The method of claim 1, wherein the SCB is a differential bus.

12. The method of claim 1, wherein the SCB is a single wire bus.

13. The method of claim 1, wherein the SCB comprises a serial data wire and a serial clock wire.

14. An apparatus for synchronizing an event using a sequencing controller, comprising:

means for monitoring a serial communication bus (SCB) for a first reference level;

means for upon identifying that the SCB is at the first reference level for a predetermined period, broadcasting a bit sequence indicative of an event position to be arbitrated on the SCB between any other sequencing controllers coupled to the SCB;

means for monitoring the SCB for the bit sequence;

means for upon determining that the monitored bit sequence corresponds to the bit sequence of the event position of the sequencing controller, determining that the sequencing controller wins a state arbitration and enabling an event corresponding to the event position; and means for causing the sequencing controller that wins the state arbitration to not participate in a subsequent event position arbitration.

15. The apparatus of claim 14, further comprising, upon determining that the enabled event has completed within a threshold time:

means for reporting the completion on the SCB; and means for entering a standby mode until at least one of:
(i) each of the plurality of sequencing controllers have had a turn to win an arbitration on the SCB, (ii) a sequencing direction change is detected, or (iii) a fault condition is identified.

16. The apparatus of claim 15, wherein the standby mode comprises at least one of:
(i) means for not broadcasting the bit sequence in subsequent arbitration cycles; or
(ii) means for broadcasting an event position higher than that of any other sequencing controller of the plurality of sequencing controllers.

17. The apparatus of claim 14, further comprising, upon enabling the event:

means for reporting the enablement on the SCB; and means for staying in a standby mode for subsequent arbitration cycles until at least one of:
(i) each of the plurality of sequencing controllers have had a turn to win an arbitration on the SCB,
(ii) a sequencing direction change is detected, or (iii) a fault condition is identified.

18. The apparatus of claim 14, further comprising, upon determining a fault condition:

means for preventing a release of the SCB for subsequent arbitration cycles; and means for reporting the fault condition on the SCB.

19. The apparatus of claim 14, further comprising, means for maintaining the SCB at a second reference level during the enabling of the event.

20. The apparatus of claim 14, wherein means for monitoring the SCB for the bit sequence comprises:

means for reading a level of the SCB, for every broadcast bit of the event position;

means for storing the level of the SCB, for every broadcast bit of the event position, in a memory of the sequencing controller, to create a present bus position; and means for comparing the event position to the present bus position.

21. The apparatus of claim 14, wherein, during an arbitration, the second reference level is dominant over the first reference level on the SCB.

22. The apparatus of claim 14, wherein an event position of a down sequence of the event synchronization is a bit-wise inverse of the event position of an up sequence.

23. The apparatus of claim 14, further comprising means for arbitrating a state bit prior to performing event position arbitration, wherein a loss of the state arbitration causes a given sequencing controller that wins the state arbitration to not participate in the event position arbitration.

24. The apparatus of claim 14, wherein the SCB is a differential bus.

25. The apparatus of claim 14, wherein the SCB is a single wire bus.

26. The apparatus of claim 14, wherein the SCB comprises a serial data wire and a serial clock wire.

27. A sequencing controller comprising:

a bidirectional terminal coupled to a serial communication bus (SCB); and a control logic unit having a first input coupled to an output of the bidirectional terminal and an enable port operative to control a device, wherein the control logic unit is configured to:
enable the device upon winning an arbitration with other sequencing controllers coupled to the SCB, upon broadcasting a bit sequence indicative of an event position on the SCB; and prevent the sequencing controller that wins the arbitration participating in a subsequent arbitration.

28. The sequencing controller of claim 27, wherein the control logic unit is further configured to, upon determining that the enabled event has completed within a threshold time:

report the completion on the SCB; and enter a standby mode until at least one of: (i) each of the plurality of sequencing controllers have had a turn to win an arbitration on the SCB, (ii) a sequencing direction change is detected, or (iii) a fault condition is identified.

29. The sequencing controller of claim 27, wherein the SCB is a differential bus.

30. The sequencing controller of claim 27, wherein the SCB is a single wire bus.

31. The sequencing controller of claim 27, wherein the SCB comprises a serial data wire and a serial clock wire.

32. The sequencing controller of claim 27, wherein the device is a power supply, and wherein an event position of a down sequence of event synchronization is a bit-wise inverse of the event position of an up sequence.

* * * * *